(12) United States Patent
Reidel

(10) Patent No.: US 6,427,613 B1
(45) Date of Patent: Aug. 6, 2002

(54) LAWN SHAKER

(76) Inventor: Emily Reidel, 96 Spier Rd., Scarsdale, NY (US) 10583

( * ) Notice: Subject to any disclaimer, the term of this patent is extended or adjusted under 35 U.S.C. 154(b) by 0 days.

(21) Appl. No.: 09/675,886

(22) Filed: Sep. 29, 2000

(51) Int. Cl.[7] .................................................. A01C 5/02
(52) U.S. Cl. ........................................ 111/130; 111/92
(58) Field of Search ............................ 111/82, 92, 94, 111/95, 96, 97, 98, 130

(56) References Cited

U.S. PATENT DOCUMENTS

| | | | | |
|---|---|---|---|---|
| 2,123,450 A | * | 7/1938 | Brandt et al. .............. | 111/92 X |
| 2,140,266 A | * | 12/1938 | Leeberg ..................... | 111/92 X |
| 2,171,037 A | * | 8/1939 | Mahurin ...................... | 111/92 |
| 2,747,528 A | * | 5/1956 | Hunkins ...................... | 111/92 |
| 4,290,374 A | * | 9/1981 | Maples ........................ | 111/92 |
| 4,336,845 A | | 6/1982 | Kolb ........................... | 172/349 |
| 4,934,289 A | * | 6/1990 | Robinson .................... | 111/92 X |
| 5,632,342 A | | 5/1997 | Knoblich et al. ............. | 172/21 |
| 5,787,990 A | | 8/1998 | Miller ......................... | 172/21 |
| 5,924,369 A | * | 7/1999 | Hatcher ...................... | 111/92 |
| 6,279,496 B1 | * | 8/2001 | Mitchell et al. .............. | 111/92 |

OTHER PUBLICATIONS

Mills, K., "A Business No One Else Wants to Touch", The Journal News, Gannett (pub.), May 12, 1999, p. 3D.

* cited by examiner

Primary Examiner—Christopher J. Novosad
(74) Attorney, Agent, or Firm—Cheryl H. Agris

(57) ABSTRACT

The present invention is directed to a lightweight easy to use lawn shaker that can be used for aerating the lawn and distributing dry lawn improvement substances such as grass seed, weed killer, fertilizer and dry pesticides. These substances are easily stored in canisters that are easily interchangeable.

22 Claims, 3 Drawing Sheets

LAWN SHAKER

FIELD OF THE INVENTION

The present invention is directed to a lawn shaker that can be used for aerating the lawn and distributing lawn improvement substances such as grass seed, weed killer, fertilizer and dry pesticides.

BACKGROUND OF THE INVENTION

The spot aerating and seeding of a lawn has always been a cumbersome labor intensive and back-straining process. It would be necessary to use one tool, such as a rake or pitchfork, trough or shoes with nails protruding, to aerate a small portion of the lawn. Then one would have to get a bag of grass seed, bend over and carefully and evenly spread the seed over the area and then press the seeds into the soil.

The process of spreading weed killer has also been labor intensive, cumbersome and wasteful. In the past, a spreader would have to be used to spread weed killer indiscriminately over a large section of the lawn covering much more ground than necessary. Formerly, another method would be to selectively spray liquid weed killer, which would permit the inhaling of the spray and a wider contamination of the area than necessary. These previous methods incorporate greater handling of the harmful chemicals.

Combination garden tools have been disclosed. Specifically, U.S. Pat. No. 4,336,845 discloses a combination garden tool containing a first tool which has a handle and a second tool which are detachably coupled to each other. The second tool is secured to a coupling mechanism, preferably a clamping bolt. In this patent, the first tool is an oscillatory weeder and the second tool is a finger wheel roller. U.S. Pat. No. 5,632,342, discloses a lawn spreader which consists of a cylindrical drum which contains a plurality of spaced-apart spike arrays along its surface. A door at one end of the drum allows for deposit of, for example, grass seed. U.S. Pat. No. 5,787,990 discloses a lawn too which contains a tubular shaft for seed or fertilizer feeding and a soil breaking element attached to the bottom portion. In contrast to the lawn shaker, the tubular shaft does not appear to be detachable. Although these tools can be used for a combination of tasks, they are relatively complex and difficult to operate.

There is a need for a tool that simplifies the process of aerating, seeding, and weeding, greatly reduces the amount of physical strain, is easy to operate and is lightweight. Therefore, it is an object of the invention to provide a tool that can both aerate the soil and distribute lawn improvement substances such as weed killer, fertilizer, grass seed, and/or dry pesticide onto the lawn.

SUMMARY OF THE INVENTION

The invention is directed to a lawn shaker comprising
(a) a shaft having a linear portion and a base portion;
(b) a canister detachably mounted to said shaft; where said canister comprises a base portion and said base portion of said canister comprises a means for distributing a dry lawn improvement substance onto soil of said lawn and
(c) at least five prongs attached to the bottom of the base portion of said shaft.

The invention is also directed to methods for using the lawn shaker of the present invention to distribute dry lawn improvement substance. If the dry lawn improvement substance is grass seed, the method comprises the following steps:

(a) aerating the soil with prongs of the lawn shaker;
(b) distributing said grass seed from the canister of the lawn shaker onto the aerated soil and
(c) pressing the grass seed into the soil with the prongs of said lawn shaker.

If the dry lawn improvement substance is weed killer, fertilizer, or dry pesticide the method comprises:

(a) placing the prongs of the lawn shaker onto the lawn and
(b) distributing said lawn improvement substance from the canister of the lawn shaker onto the soil where the prongs are placed.

DETAILED DESCRIPTION OF THE INVENTION

The lawn shaker is a single lawn and gardening tool that first aerates the soil, then distributes dry lawn improvement material evenly onto the aerated soil. The dry lawn improvement material is selected from the group consisting of grass seed, dry pesticide, fertilizer, and weed killer.

Figure 1:
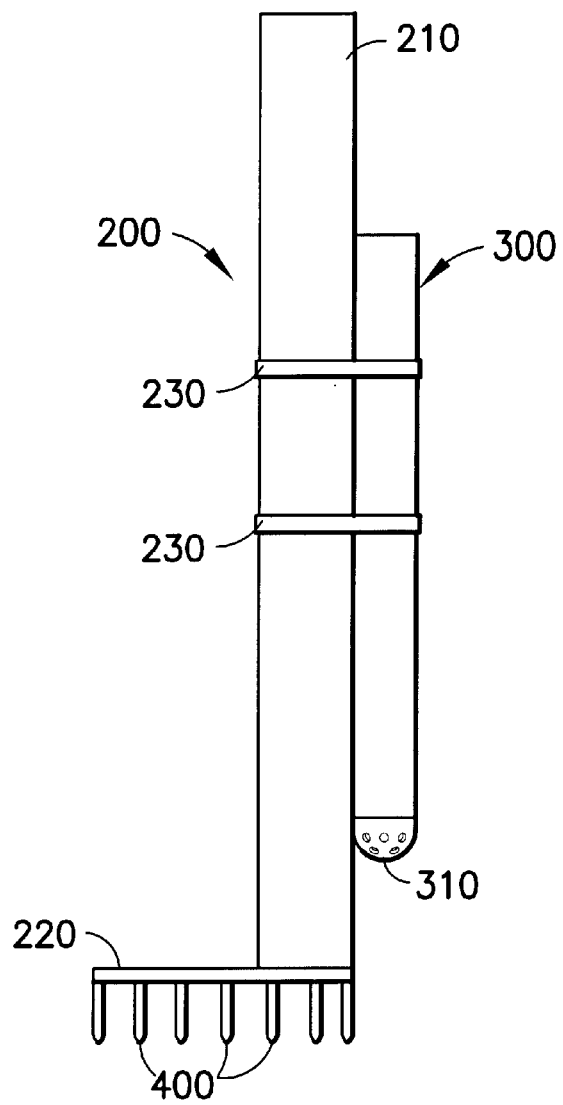
FIG. 1 shows a view of the entire lawn shaker where the base is attached to the linear portion of the shaft. The canister is attached with industrial strength Velcro.
Figure 3:
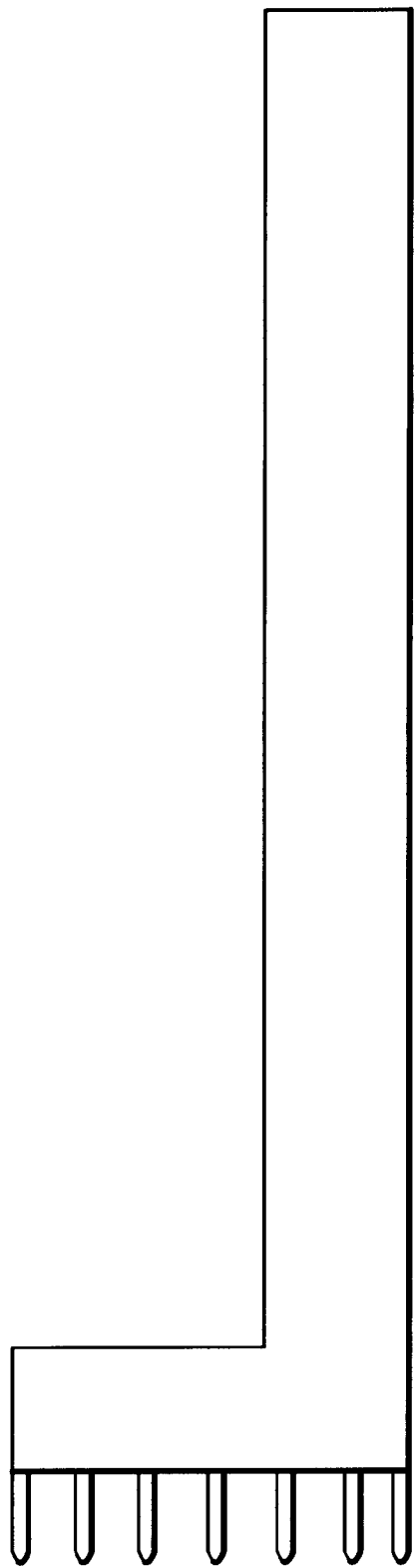
FIG. 3 shows the lawn shaker where the entire shaft is completely made of metal.

The shaft 200 of the lawn shaker (see FIG. 1) has a linear portion 210 and a base portion 220. The shaft has a length of about four to about five feet, preferably about four feet in length and about 1.25 inches in diameter. In one embodiment, the base extends perpendicularly from the linear portion. The entire shaft may be made of wooden or metal material (see FIG. 3). Alternatively, the linear portion may be wooden and the base metal. The base may in such a circumstance be attached to the linear portion, for example, via a nut and bolt assembly. Between about 5–15 and preferably, seven metal prongs 400, preferably, 1–1.5 inches in length are attached to the bottom of the base portion of the shaft.

Figure 2:
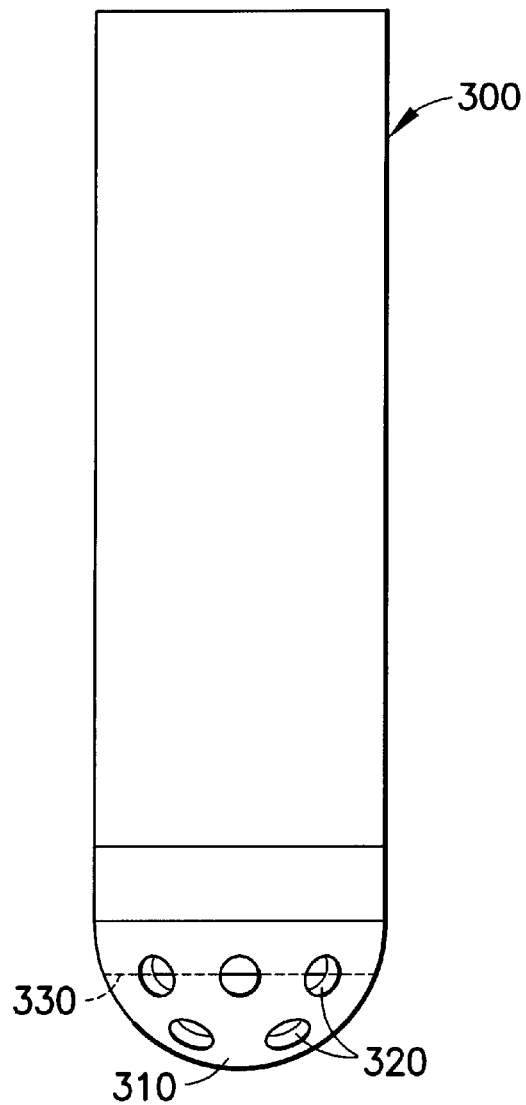
FIG. 2 shows a close up of the canister showing the holes and the top.

The canister 300 (see FIG. 2) can be made of hard plastic or a light metal, such as aluminum. It may be detachably mounted to the shaft by various means, for example, with industrial strength velcro 230. One piece of the Velcro is attached to the linear portion of the shaft, another to the canister. Velcro strips also wrap around the canister and linear portion of the shaft to further secure the canister to the linear portion of the shaft. Nut and bolt assemblies coupled with wrap-around metal fasteners can also be used. Alternatively, mating grooves attached to the pole and canister can be used.

The canister is about 10–12 inches in length and preferably 12 inches long and three–four inches in diameter and preferably, three inches in diameter. In a specific embodiment, it has a lid 310 with about 7–10 open holes 320, in which each hole is about ¼–⅜ inches in diameter and an adjustable circular sliding top 330 that fits inside the lid to adjust hole size to allow for the even spread of lawn improvement material.

EXAMPLE

In the method of the present invention, when the lawn shaker is used, for example, to distribute grass seed, the lawn shaker is loaded with grass seed by inverting the lawn shaker, unscrewing the lid 310 of the canister 300 and pouring grass seed into the canister. The lid is screwed back on. This lid is the same lid that opens to deploy the grass seed.

The person using the lawn shaker holds the top of the shaft 210 perpendicular to the soil and without bending and with very little effort gently aerates the soil by moving the lawn shaker up and down to puncture the soil with the seven pointed prongs 400 at the base of the tool.

The lawn shaker is then inverted. The lid 310 of the canister contains a sliding top 340. The top is turned to open the holes 330 to the desired size. The end with the open holes is pointed toward the soil, the handle is shaken and seeds are dropped evenly to the soil. When the desired amount of seed is spread, the person lifts the lawn shaker, inverts its and turns the end of the canister with the holes clockwise to close the holes.

The user then closes the base of the lawn shaker with the pointed prongs towards the soil and gently presses the seeds into the soil, permitting an even growth of grass and deeper planting to provide stronger roots.

When weed killer, fertilizer or pesticide is applied, the prongs are placed onto the soil to anchor the lawn shaker. Aerating the soil is not necessary but could be done. The weed killer, fertilizer or pesticide is then distributed.

Figure 4:
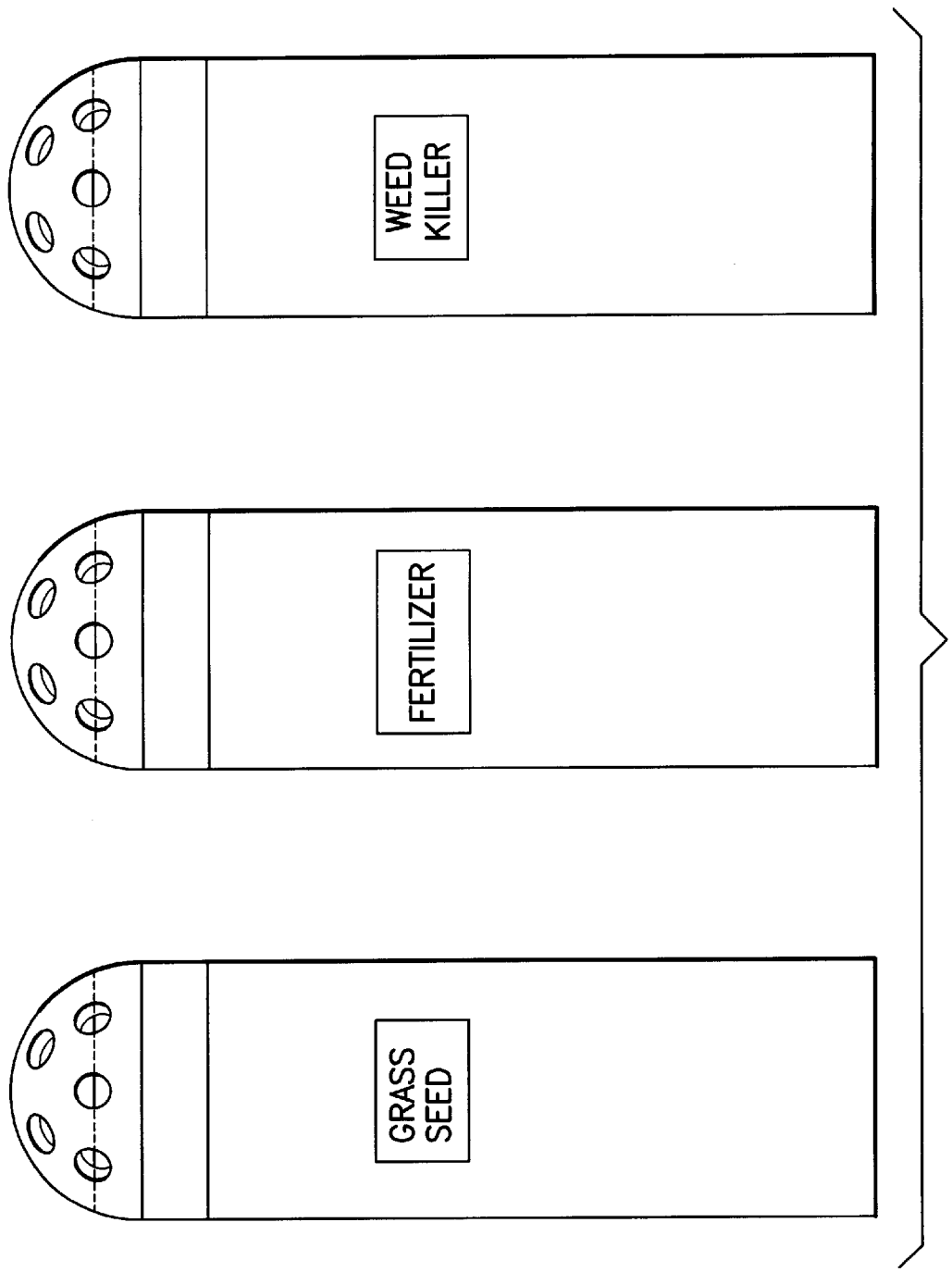
FIG. 4 shows a series of extra canisters stored and labeled for interchangeable uses.

The seed canister is interchangeable with a weed killer canister, which functions exactly like the seed canister (see FIG. 4). The advantage of using a separate canister for weed killer is that this chemical can be stored permanently, limiting the amount of handling and inhalation of the chemical. Using the canister for weeds permits the careful spreading of dry weed killer directly onto the weeds in limited quantity, thereby greatly reducing the area of the lawn coming into contact with the chemical. Furthermore, additional canisters can be obtained to store and use various lawn products.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

Various references are cited herein, the disclosure of which are incorporated by reference in their entireties.

What is claimed is:

1. A lawn shaker comprising
    (a) a shaft having a linear portion and a base portion;
    (b) a canister detachably mounted to said shaft, wherein said canister comprises a base portion and said base portion of said canister comprises a means for distributing a dry lawn improvement substance onto soil of said lawn, wherein said means is a lid comprising holes and a means inside the lid to adjust hole size and
    (c) at least five prongs attached to the bottom of the base portion of said shaft.

2. The lawn shaker according to claim 1, in which said canister comprises a means for distributing a dry lawn improvement substance onto soil of said lawn, wherein said means is a lid comprising no more than about 10 holes, wherein each hole has a diameter of at least about ¼ inches and an adjustable sliding top that fits inside the lid to adjust hole size.

3. The lawn shaker according to claim 1, in which said canister comprises a means for distributing a dry lawn improvement substance onto soil of said lawn, wherein said means is a lid comprising no more than 10 holes, wherein each hole has a diameter of no more than about ⅜ inches and an adjustable sliding top that fits inside the lid to adjust hole size.

4. The lawn shaker of claim 1, in which the base portion of said shaft extends perpendicularly from the linear portion of said shaft.

5. The lawn shaker of claim 1, in which the linear portion of the shaft is wooden and the base portion of the shaft is metal.

6. The lawn shaker of claim 1, in which the shaft has a length of about four to about five feet.

7. The lawn shaker of claim 1, in which the shaft has a diameter of about 1.25 inches.

8. The lawn shaker of claim 1, in which the dry lawn improvement substances are selected from the group consisting of grass seed, fertilizer, weed killer, and pesticide.

9. The lawn shaker of claim 1, wherein the canister is mounted to said shaft via one or more velcro strips.

10. The lawn shaker of claim 1, in which velcro strips are attached to both the shaft and the canister.

11. The lawn shaker of claim 1, in which the velcro strips are wrapped around both the shaft and the canister.

12. The lawn shaker of claim 1, in which the canister is plastic or metal.

13. The lawn shaker of claim 1, in which the canister is about 10–12 inches in length and about 3–4 inches in diameter.

14. The lawn shaker of claim 1, in which said tool comprises between five and fifteen prongs.

15. A method for distributing grass seed into soil of said lawn comprising:
    (a) aerating the soil with prongs of the lawn shaker of claim 1;
    (b) distributing grass seed from the canister of the lawn shaker of claim 1 and
    (c) pressing the distributed grass seed of step (b) into the soil.

16. A method for distributing a dry lawn improvement substance selected from the group consisting of weed killer, fertilizer, or dry pesticide onto soil of said lawn comprising
    (a) placing the prongs of the lawn shaker of claim 1 onto soil of the lawn and
    (b) distributing said lawn improvement substance from the canister of the lawn shaker onto the soil where the prongs are placed.

17. A lawn shaker comprising
    (a) a shaft having a linear portion and a base portion;
    (b) a canister detachably mounted to said shaft via one or more velcro strips; where said canister comprises a base portion and said base portion of said canister comprises a means for distributing a dry lawn improvement substance onto soil of said lawn and
    (c) at least five prongs attached to the bottom of the base portion of said shaft.

18. A method for distributing grass seed into soil of said lawn comprising:
    (a) aerating the soil with prongs of the lawn shaker of claim 17;
    (b) distributing grass seed from the canister of the lawn shaker of claim 17 and
    (c) pressing the distributed grass seed of step (b) into the soil.

19. A method for distributing a dry lawn improvement substance selected from the group consisting of weed killer, fertilizer, or dry pesticide onto soil of said lawn comprising
- (a) placing the prongs of the lawn shaker of claim 17 onto soil of the lawn and
- (b) distributing said lawn improvement substance from the canister of the lawn shaker onto the soil where the prongs are placed.

20. A lawn shaker comprising
- (a) a shaft having a linear portion and a base portion, in which the base portion of said shaft extends perpendicularly from the linear portion of said shaft;
- (b) a canister detachably mounted to said shaft; where said canister comprises a lid comprising holes and an adjustable sliding top that fits inside the lid to adjust hole size to distribute a dry lawn improvement substance selected from the group consisting of grass seed, fertilizer, weed killer, and pesticide onto soil of said lawn and
- (c) between five–fifteen prongs attached to the bottom of the base portion of said shaft.

21. A method for distributing grass seed into soil of said lawn comprising:
- (a) aerating the soil with prongs of the lawn shaker of claim 20;
- (b) distributing grass seed from the canister of the lawn shaker of claim 20 and
- (c) pressing the distributed grass seed of step (b) into the soil.

22. A method for distributing a dry lawn improvement substance selected from the group consisting of weed killer, fertilizer, or dry pesticide onto soil of said lawn comprising
- (a) placing the prongs of the lawn shaker of claim 20 onto soil of the lawn and
- (b) distributing said lawn improvement substance from the canister of the lawn shaker onto the soil where the prongs are placed.

* * * * *